United States Patent [19]

Kropac

[11] 4,301,268

[45] Nov. 17, 1981

[54] PROCESS FOR THE PREPARATION OF ORGANOPOLYSILOXANES MODIFIED WITH METHACRYLIC ESTERS

[75] Inventor: Vaclav Kropac, Essen, Fed. Rep. of Germany

[73] Assignee: TH. Goldschmidt AG, Essen, Fed. Rep. of Germany

[21] Appl. No.: 868,545

[22] Filed: Jan. 11, 1978

[30] Foreign Application Priority Data

Jan. 12, 1977 [GB] United Kingdom ............... 1227/77

[51] Int. Cl.$^3$ .................. C08G 77/14; C08L 83/06
[52] U.S. Cl. ............................... 528/26; 525/479; 556/442
[58] Field of Search ......... 260/827, 448.2 B, 448.8 R, 260/448.8 Q; 528/11, 26; 525/479; 556/442

[56] References Cited

U.S. PATENT DOCUMENTS

| | | | |
|---|---|---|---|
| 3,577,262 | 5/1971 | Nordstrom | 260/827 |
| 3,577,264 | 5/1971 | Nordstrom | 260/827 |
| 3,585,065 | 6/1971 | Johnson | 260/827 |
| 3,668,272 | 6/1972 | Sekmakas | 260/827 |

FOREIGN PATENT DOCUMENTS 2232419 9/1973 Fed. Rep. of Germany .
1384898 2/1975 United Kingdom .

*Primary Examiner*—Wilbert J. Briggs, Sr.
*Attorney, Agent, or Firm*—Toren, McGeady & Stanger

[57] ABSTRACT

A method for preparation of organopolysiloxanes suitable for use as binders in hardenable compositions of polymerizable monomers, the organopolysiloxanes being modified with methacrylic esters by reacting —COH-group containing methacrylic esters with organopolysiloxanes containing —SiX groups wherein X is alkoxyl, hydroxyl or chloro and wherein the organopolysiloxanes are reacted from 0.05 to equimolar amounts of pentaerythritol trimethacrylate. The organopolysiloxanes of the present invention exhibit rapid hardening properties under curing conditions. The compounds and compositions obtained with this process are also disclosed.

12 Claims, No Drawings

PROCESS FOR THE PREPARATION OF ORGANOPOLYSILOXANES MODIFIED WITH METHACRYLIC ESTERS

BACKGROUND OF THE INVENTION

1. Field of the Invention

The invention relates to a process for the preparation of organopolysiloxanes, modified with methacrylic esters, more particularly, this is accomplished by reacting -COH-group containing methacrylic esters with organopolysiloxanes, which contain SiX groups wherein X is alkoxyl, hydroxyl or chloro, optionally in the presence of catalysts.

2. Description of the Prior Art

Hardenable siloxanes with olefinic unsaturations are known and conventional in the art. These may be obtained by reacting a siloxane which has hydroxyl and/or alkoxy groups with a hydroxy ester of an olefinic, $\alpha,\beta$ unsaturated carboxylic acid. In conjunction with polymerizable monomers, such siloxanes may be used as hardenable binders.

Products and processes for their preparation are described, for example, in the German Pat. Nos. 1,957,356, 1,957,357, and 1,957,358.

In German Pat. No. 1,957,356, for example, a paint binder is described which is based on a siloxane in combination with unsaturated monomers and which can be hardened by ionizing radiation. The binder consists of a film-forming solution of:

(a) 10 to 80, and preferably, 30 to 70 weight percent of vinyl monomers, and (b) 90 to 20, and preferably, 70 to 30 weight percent of a siloxane with olefinic unsaturation, which is obtained by reacting a siloxane, which contains 3 to 18, and preferably, 3 to 12 silicon atoms per molecule and has at least two functional groups, namely, hydroxyl groups and/or alkoxy groups with a hydroxy ester of an olefinic, $\alpha,\beta$ unsaturated carboxylic acid.

The other German patents mentioned differ from the above essentially in the choice of unsaturated compounds which are capable of copolymerizing and are contained in the mixture in addition to the modified siloxane mixture.

As is evident from these patents, an electron beam with an average energy of 100,000 to 500,000 eV is required for curing this mixture of compounds. Such curing conditions can be fulfilled if the area where they are to be applied are favorably located. However, the scope of application of organopolysiloxanes, modified with methacrylic esters, for example, could be enlarged significantly, if it were possible to find organopolysiloxanes, modified with unsaturated compounds which cure under milder conditions and especially at a significantly increased rate. This is the basic object and purpose of the present invention.

SUMMARY OF THE INVENTION

Surprisingly, this object could be accomplished in accordance with the invention by reacting organopolysiloxanes with 0.05 to equimolar (based on —COH and —SiX groups) amounts of pentaerythritol trimethacrylate using conventional procedures. The compounds obtained from this process cure very quickly under relatively mild conditions.

DESCRIPTION OF THE PREFERRED EMBODIMENTS

The inventive process proceeds advantageously in the presence of catalysts, such as, for example, titanic esters, isopropyl titanate or butyl titanate, preferably at elevated temperatures and especially at temperatures from 120° to 150° C. In addition, polymerization inhibitors are advantageously used. Hydroquinone, methylhydroquinone and copper have proven their value.

Particularly useful compounds are obtained when pentaerythritol trimethacrylate is reacted with organopolysiloxanes of the formula

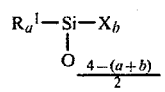

in which $R^1$ is an alkyl group with 1 to 4 carbon atoms and/or an aryl group,

X is a chloro group or an $OR^2$ group in which $R^2$ is an alkyl group with 1 to 4 carbon atoms and/or hydrogen, a has a value of 1.0 to 2.0, b has a value of 0.02 to 1.6, $a+b \leq 2.66$, and the siloxane molecule has 3 to 100 Si atoms.

When $R^1$ is an alkyl group, the methyl group is preferred. When $R^1$ is an aryl group, the phenyl group is preferred. However, substituted phenyl groups are also suitable and particularly suitable are those phenyl groups having substituents which are inert under the reaction conditions.

If $R^2$ is an alkyl group, the present process which can be regarded chemically as a transesterification reaction, is carried out most readily if this alkyl is a methyl group.

Especially preferred are those siloxanes in which at least 80 mole % of the $R^1$ groups are methyl and/or phenyl groups.

Of particular interest are those siloxanes wherein:

X is a methoxy group, a has a value of 1.0, b has a value of 0.3 to 0.9 and the siloxane molecule has 8 to 15 Si atoms.

An example of such compounds is

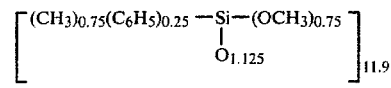

Instead of siloxanes which are merely branched, siloxanes which contain functional structural units may also be used. In such compounds:

X is a methoxy group, a has a value of 1.1 to 1.35, b has a value of 0.15 to 0.30, and the siloxane molecule contains 20 to 30 Si atoms.

An example of such compounds is

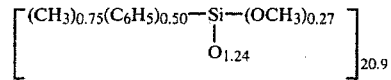

Alternatively, siloxanes may be used in which

X is a Cl group,
a has a value of 1.9 and 1.95,
b has a value of 0.1 to 0.2, and
the siloxane molecule contains 20 to 30 Si atoms.
An example of such compounds is

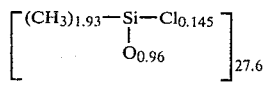

Polydimethylsiloxanes may also be used wherein
X is a —Cl or —OH group,
a has a value of 2,
b has a value of 0.02 to 0.06 and
the siloxane molecule contains 30 to 100 Si atoms.
An example of such compounds is

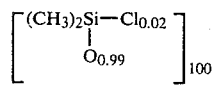

The inventively prepared compounds preferably contain from about 20 to 95 weight % of siloxane.

After the addition of known initiators, such as, for example, benzophenone and its derivatives, benzoin and its alkyl ethers (such an initiator is obtainable commercially, for example, under the name of IRGACURE 651), the inventively prepared compounds can be cured in a very brief time by UV radiation. As a rule, the curing time is less than 1 second. The inventive compounds may therefore be used, for example, as binders or binder additives for printing colors, in which the printing colors which are hydrophobic, are fixed on the support by UV curing. This is of particular importance for printing colors, whose hydrophobic properties are utilized in printing.

The inventively prepared compounds may also be used for preparing lacquer binders or other coating materials, for example, as a backing material or additive for coating paper, wood or metal surfaces. In this case also, the cure time which is frequently reduced to fractions of a second, is of particular importance from the point of view of practical application.

The inventively prepared compounds may also be used by themselves as hardenable coatings or binders. For many applications, it is however advantageous to add hardenable unsaturated compounds to the inventively prepared compounds in order to influence the properties and/or to reduce the costs of the system, as is described in the patents mentioned in the state of the art. However, compared to the above-mentioned patents, a significantly lesser proportion of inventively prepared compounds suffices for obtaining products with properties well suited for their application. In particular, the addition of less than about 20, and especially about 10 weight % of the inventively prepared compounds to the unsaturated compounds capable of copolymerizing, is sufficient. The minimum amount should be about 1 weight %.

The properties of the inventively prepared compounds may also be affected by modifying the siloxane block with higher molecular weight organic residues. This is particularly so with respect to lacquering uses of the compounds.

In thus another embodiment of the present process, up to 80 mole % of the $OR^2$ groups are replaced by a polymeric organic residue, which is linked to the siloxane block by an —OC bond.

A saturated polyester residue is particularly suitable as the polymeric organic residue. The OH-group containing polyester molecule, used at the starting material, may be prepared by condensing adipic acid, terephthalic acid, isophthalic acid, phthalic acid or their esters or anhydrides with multivalent alcohols, such as, for example, ethylene glycol, dimethylol cyclohexane, trimethylolpropane, glycerin and pentaerythritol. Other suitable polymeric organic building blocks are OH-group containing epoxides, acrylates and oil alkyds.

By such modifications, it is possible to adapt the properties of the products of the process more to the properties of the carbon organic compounds or flexibly, depending on the intended application, more to the properties of the silicon organic compounds.

The preparation of the organopolysiloxanes, used as starting compounds is described, for example, in the German Auslegeschrift No. 2,232,419.

The inventive preparative processes, the curing of the process products and the properties of the process products are described in greater detail in the following examples.

EXAMPLE 1

150 g of a methoxy-functional phenylmethylpolysiloxane, prepared from phenyltrichlorosilane and methyltrichlorosilane, having a methyl:phenyl ratio of 3 and containing 17.2% methoxy groups, 248 g of pentaerythritol acrylate, 0.06 g of hydroquinone and 0.11 g of butyl titanate are added to a flask and heated. Air is passed into the reaction mixture during the reaction. The reaction proceeds at 135° to 140° C. and takes 1.5 hours, during which time the methanol, that is formed, is distilled off. The filtered product is clear, yellowish and has a viscosity of 4200 cSt at 25° C.; in all examples the viscosity was determined by a forced ball viscometer (type Hoeppler). The product was undiluted, so the determined viscosity is the viscosity of the product itself. The molar ratio of COH:SiX=1.0.

EXAMPLE 2

An inventive polysiloxane with a viscosity of 3900 cSt at 25° C., is prepared from 150 g of the phenylmethylpolysiloxane, described in Example 1, 248 g of pentaerythritol trimethacrylate, 0.06 g of hydroquinone and 0.11 g of butyl titanate using the procedure described in Example 1.

EXAMPLE 3

An inventive polysiloxane, having a viscosity of 2200 cSt at 25° C. is prepared from 150 g of the polysiloxane described in Example 1, which, however, contains 28% of methoxy groups, 248 g of pentaerythritol triacrylate, 0.06 g of hydroquinone and 0.23 g of butyl titanate using the procedure described in Example 1. The molar ratio of COH:SiX=0.61.

EXAMPLE 4

300 g of a polysiloxane, having the average formula

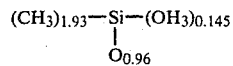

and containing, on the average, 27.6 Si atoms per molecule, are reacted with 164 g of pentaerythritol triacrylate, 0.06 g of hydroquinone and 0.2 g of butyl titanate using the procedure described in Example 1. The molar ratio of COH:SiX=0.33.

EXAMPLE 5

300 g of an Si-Cl functional polysiloxane of average formula

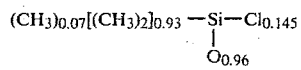

166 g of pentaerythritol triacrylate, 500 g of toluene and 0.5 g of copper powder are added to a reaction vessel. Ammonia is passed in at a temperature of 25° to 30° C. Water and n-butanol are added as soon as the reaction mixture is alkaline. The aqueous layer is separated off and the organic layer is freed from solvent by vacuum distillation at 20 torr and a temperature of 80° C. The filtered product is clear, yellowish and has a viscosity of 8000 cSt at 25° C. The molar ratio of COH:SiX=0.33.

EXAMPLE 6

261 g of an α,ω-dihydroxydimethylpolysiloxane of the average composition

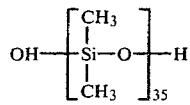

48 g of pentaerythritol triacrylate, 300 g of xylene, 0.15 g of butyl titanate and 0.5 g of copper powder are added to a reaction vessel and heated to a reaction temperature of 148° C. to 152° C. The resultant water is distilled off azeotropically during the reaction. The formation of water is finished after 90 minutes. The reaction mixture is cooled to 80° C. and the xylene is distilled off under vacuum (30 torr). The filtered, clear product has a viscosity of 120 cSt at 25° C. The molar ratio of COH:SiX=0.25.

EXAMPLE 7

100 g of the phenylmethylpolysiloxane that is described in Example 1 and has 20% methoxy groups, is initially reacted with 100 g of a polyester of isophthalic acid, ethylene glycol and trimethylolpropane with an OH number of 200, and 0.08 g of butyl titanate. Subsequently, the reaction product is reacted with 83 g of pentaerythritol triacrylate, 0.02 g of hydroquinone and 0.02 g of butyl titanate, according to the process described in Example 1. The clear, yellowish product has a viscosity of 25,000 cSt at 25° C. The molar ratio of COH:SiX=0.3.

EXAMPLE 8

A polysiloxane according to the invention which has a viscosity of 280 cSt at 25° C. is prepared according to Example 1 from 100 g of the polysiloxane described in Example 1, which, however, contains 28% of methoxy groups, 13.5 g of pentaerythritol triacrylate, 0.3 g of copper and 0.17 g of butyl titanate. The molar ratio of COH:SiX=0.05.

EXAMPLE 9

5 weight percent of benzophenone are dissolved in the products of Examples 1 to 8. The mixtures are applied with a spiral doctor blade at a thickness of 12μ and cured under a UV lamp (80 watt/cm). All products cured in less than one second.

What is claimed is:

1. In a process for the preparation of organopolysiloxanes which are modified with methacrylic esters wherein —COH-group containing methacrylic esters are reacted with organopolysiloxanes which contain —SiX groups wherein X is alkoxyl, hydroxyl or chloro, the improvement which comprises said organopolysiloxanes being reacted with from 0.05 to equimolar amounts, based on —COH and —SiX groups, of pentaerythritol trimethacrylate, the organpolysiloxanes having the formula

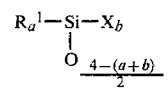

in which
R$^1$ is an alkyl group with 1 to 4 carbon atoms or an aryl group;
X is a chloro group or methoxy;
a has a value from 1.0 to 2.0;
b has a value from 0.02 to 1.6;
a+b≦2.66; and
the siloxane molecule has from 3 to 100 Si atoms.

2. The process according to claim 1 wherein at least 80 mole % of the R$^1$ groups are methyl or phenyl.

3. The process of claim 1 wherein
X is a methoxy group,
a has a value of 1.0,
b has a value from 0.3 to 0.9 and
the siloxane molecule has 8 to 15 Si atoms.

4. The process of claim 1 wherein
X is a methoxy group,
a has a value from 1.1 to 1.35,
b has a value from 0.15 to 0.30, and
the siloxane molecule has 20 to 30 Si atoms.

5. The process of claim 1 wherein
X is a Cl group,
a has a value from 1.9 to 1.95,
b has a value from 0.1 to 0.2, and
the siloxane molecule contains 20 to 30 Si atoms.

6. The process of claim 1 wherein
X is Cl—,
a has a value of 2.0,
b has a value from 0.02 to 0.06, and
the siloxane molecule contains 30 to 100 Si atoms.

7. The process of claim 1 wherein up to 80 mole % of the methoxy of the polysiloxane are replaced by a polymeric organic residue which is linked to the siloxane block by an —OC bond.

8. The process of claim 7 wherein the polymeric organic residue is a saturated polyester residue.

9. Organopolysiloxanes prepared by the process of claim 1.

10. In a hardenable composition containing a polymerizable monomer and a binder therefor, the improvement which comprises said binder being an organopolysiloxane prepared by the process of claim 1 in an amount effective to harden the composition upon curing.

11. The composition of claim 10 wherein the amount of said binder is less than about 20 percent by weight.

12. The composition of claim 10 wherein the amount of said binder is less than about 10 percent by weight.

* * * * *

UNITED STATES PATENT AND TRADEMARK OFFICE
CERTIFICATE OF CORRECTION

PATENT NO. : 4,301,268
DATED : November 17, 1981
INVENTOR(S) : Vaclav Kropac

It is certified that error appears in the above-identified patent and that said Letters Patent is hereby corrected as shown below:

Page 1, in the Abstract,
    line 4, change "methacrylic" to --(meth)acrylic--;
    line 5, change "methacrylic" to --(meth)acrylic--;
    line 9, change "trimethacrylate" to
        --tri(meth)acrylate--.

Col. 1, line 10, change "methacrylic" to --(meth)acrylic--;
    line 12, change "methacrylic" to --(meth)acrylic--;
    line 54, change "methacrylic" to --(meth)acrylic--;
    line 65, change "trimethacry-" to --tri(meth)acry- --.

Col. 2, line 12, change "trimethacrylate" to
    --tri(meth)acrylate--.

Claim 1, line 2, change "methacrylic" to --(meth)acrylic--;
    line 3, change "methacrylic" to --(meth)acrylic--;
    line 9, change "trimethacrylate" to
    --tri(meth)acrylate--.

Signed and Sealed this

Twenty-first Day of August 1984

[SEAL]

Attest:

GERALD J. MOSSINGHOFF

Attesting Officer     Commissioner of Patents and Trademarks